April 7, 1953
F. W. GUIBERT
2,634,177
BEARING STRUCTURE UTILIZING BALL SUPPORTS
Filed May 20, 1949
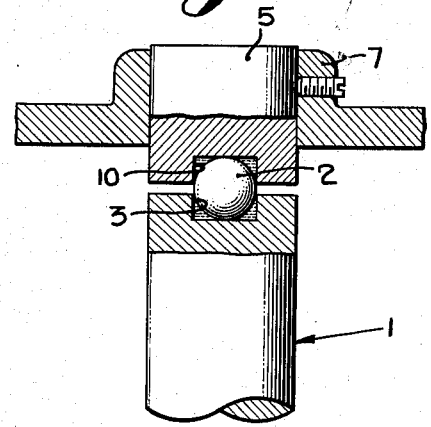
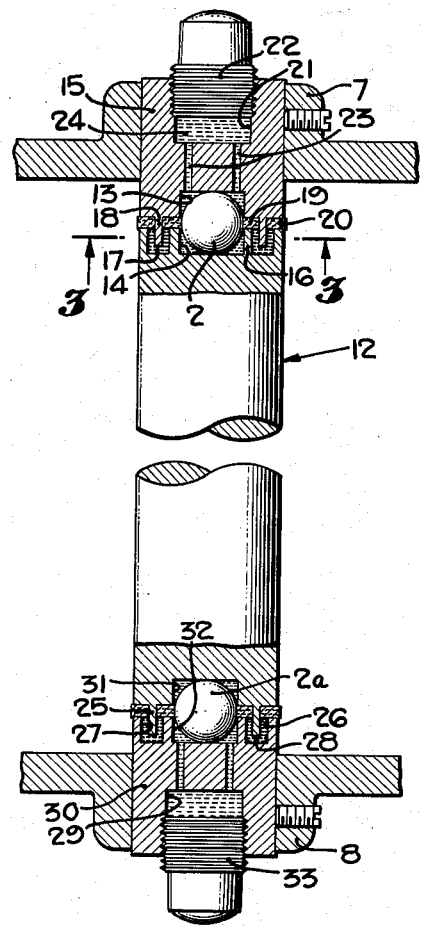
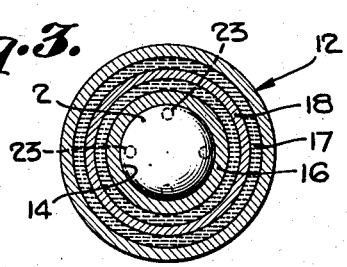
FRANCIS W. GUIBERT,
INVENTOR.
BY John Flam
ATTORNEY Patented Apr. 7, 1953

2,634,177

UNITED STATES PATENT OFFICE 2,634,177

BEARING STRUCTURE UTILIZING BALL SUPPORTS

Francis Walter Guibert, Los Angeles, Calif.

Application May 20, 1949, Serial No. 94,370

9 Claims. (Cl. 308—187.1)

This invention relates to bearings, and particularly to bearings for vertical shafts, and employing a ball beneath the shaft for sustaining the thrust.

Ball supports for vertical shafts have been proposed in the past. While generally satisfactory, there is a tendency for the ball to wear in localized areas. Furthermore, when the bearing is used in a place where foreign matter can enter the bearing structure, care must be taken to seal the structure. For example, when using the bearing in connection with a meter for measuring liquids, such as crude oil, the shaft and its associated bearing structure is immersed in the liquid. Sand and other foreign matter carried by the liquid would injure the bearings.

Similarly, in metering corrosive gases, such as propane, care must be taken to seal the bearing structure against injury by the chemical action of the gas.

It is one of the objects of this invention to provide a bearing structure that is sturdy, resists wear, and is ensured against injury during operation in liquid or gaseous media.

It is another object of this invention to make it possible to reduce uneven wear of the ball by ensuring that the load is not continuously sustained by a localized area of the ball.

It is still another object of this invention to provide a bearing structure of this type that provides a radial support, as well as a thrust support.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an elevation, partly in section, of a structure incorporating the invention;

Fig. 2 is a view, similar to Fig. 1, of a modified form of the invention;

Fig. 3 is a sectional view, taken along a plane corresponding to line 3—3 of Fig. 2; and Fig. 4 is a view, similar to Fig. 1, of a further modification.

In the form of the invention illustrated in Fig. 1, a shaft or spindle 1, of indefinite length, is shown as rotatably supported on the vertical axis. For this purpose, use is made of balls 2 and 2a, disposed in cylindrical recesses 3 and 4 at the opposite ends of the shaft 1. The center of the balls falls along the axis of rotation.

In order to support the balls, use is made of cup members 5 and 6 that are held in a stationary position, as in bosses 7 and 8.

The lower cup member 6 is provided with a recess 9, conforming to the recess 4 of the shaft 1, and confining the ball 2a in the space formed by the two oppositely facing recesses. The depths of each of the recesses 4 and 9 are substantially equal; and there is a narrow clearance space between the end of the shaft 1 and the upper edge of the cup member 6.

The upper ball 2 is restrained by the aid of the recess 10 formed in the lower end of the cup member 5. The recesses 3 and 10 are shown as substantially equal in depth.

If desired, a sealing washer 11 may be interposed between the contiguous end faces of the shaft 1 and either of the cups 5 or 6. Such sealing is desirable where the shaft is exposed to a liquid or gaseous medium. The passage into the bearing structure of foreign matter, such as sand, or the like, is prevented by the seal 11.

The diameter of the recesses 3, 4, 9, and 10 is preferably made slightly larger than the diameter of the balls 2 and 2a; for example, one-thousandth of an inch clearance may be provided. Due to this clearance, balls 2 and 2a are permitted to roll slightly. Accordingly, surfaces of contact, respectively between the balls 2 and 2a and the corresponding recesses, change as the shaft 1 rotates. Uneven wear is thus prevented.

Due to the provision of the opposing recesses for the accommodation of the balls 2 and 2a in a confined space, the balls 2 and 2a serve not only as thrust bearings, but also as radial bearings. Since the bottoms of all of the recesses are formed by planes perpendicular to the cylindrical surfaces of the recesses, they form corner spaces that accommodate any foreign matter accidentally dropping into the recesses.

When it is desired to provide a more complete seal for the bearing structure, as well as to provide lubrication for the bearings, a structure such as is shown in Figs. 2 and 3 may be utilized. Here, the shaft 12 is supported for rotation about a vertical axis by the aid of the balls 2 and 2a located at opposite ends of the shaft. Ball 2 is located in the space formed by the recesses 13 and 14, respectively, in the cup member 15 and the shaft member 12. As in the form shown in Fig. 1, the ball 2 may have a slight clearance, such as one-thousandth of an inch, in the cylindrical walls of the recesses 13 and 14.

An annular wall 16 extends around the recess 14, and is open at the upper end of the shaft 12. Within this well is located a heavy, chemically inert sealing liquid, such as a body of mercury or glycerine 17, or the like. Extending into the body of mercury is an annular wall 18 carried by cup member 15, and which dips into the body of mercury 17. Ingress of foreign matter, such as sand, or other substances, is accordingly prevented. This is especially useful where the shaft 12 forms a part of an instrument, such as a meter, immersed in a liquid or gaseous medium. Gases are also prevented from acting corrosively upon the bearing surfaces. If desired, inner and outer felt washers 19 and 20 may be provided within and without the annular wall 18.

Lubrication for the bearing surfaces around ball 2 may be provided by the aid of a reservoir in the upper end of the cup 15. This reservoir is formed by a recess 21 in the cup 15, and may be closed fluid-tight by the aid of a threaded plug 22. Leading from the reservoir 21 are one or more ports or openings 23 to the recess 13. A body of oil 24 fills the space formed by the reservoir 21 and the recesses 13 and 14.

At the lower end of the shaft or spindle 12, a substantially similar sealed bearing structure is provided. In this instance, however, the annular wall 25 is disposed on the bottom of the shaft 12 and extends into the body of mercury 26. This body of mercury 26 is located in the annular recess 27 surrounding the cup recess 28. A lubricant reservoir 29 is provided in the lower end of the cup 30. The cup 30 and the lower end of the shaft 12 have cylindrical recesses 31 and 32 to accommodate the ball 2. A threaded plug 33 serves to seal the oil reservoir 29.

In Fig. 4, the shaft 34 is supported by the balls 2 and 2a, as in the forms previously described. The upper bearing is packed by the aid of a pair of annular leather rings, or the like, 36 and 37, engaging in grooves in the cup 38. In the space between the annular sealing washers is located a body of mercury 35, or other heavy sealing liquid. The remainder of the space around the ball 2 is filled with grease.

The mercury 35 is thus placed in a well formed by the annular washers 36 and 37. It forms an effective seal to protect the bearing structure against injury that may be occasioned by the action of a gas that would destroy the lubricating qualities of the grease, or other lubricant. The lower ball 2a is likewise protected by the mercury well 39 disposed between the annular washers 40 and 41. In this case, the annular washers 40 and 41 are disposed within grooves formed in the bottom edge of the shaft 34.

The inventor claims:

1. In a bearing structure for a vertical shaft member having an end cylindrical recess with its axis coincident with the axis of the shaft member; a cup member having a corresponding recess opposite the first recess; a ball in the recesses; there being an annular well around the lower of the two recesses; a sealing liquid in the well; and an annular wall carried by the upper member and extending into the liquid.

2. In a bearing structure for a vertical shaft member having an end cylindrical recess with its axis coincident with the axis of the shaft member; a cup member having a corresponding recess opposite the first recess; a ball in the recesses; there being an annular well around the lower of the two recesses; a sealing liquid in the well; an annular wall carried by the upper member and extending into the liquid; and a sealing washer between the members.

3. In a bearing structure for a vertical shaft member having an end cylindrical recess with its axis coincident with the axis of the shaft member; a cup member having a corresponding recess opposite the first recess; a ball in the recesses; said cup having another recess communicating with the first cup recess and open on the opposite end of the cup; a lubricant in the cup recesses; and a closure for said other recess.

4. In a bearing structure for a shaft having an end recess: a cup aligned with the recess; said cup and recess having axes coincident with the shaft axis; a ball in the space between the cup and the recess; the edges of the cup and recess being spaced apart; means extending between the said edges, defining an annular well around the ball; and a sealing liquid in the well.

5. In a bearing structure for a shaft having an end recess: a cup aligned with the recess; said cup and recess having axes coincident with the shaft axis; a ball in the space between the cup and the recess; the edges of the cup and recess being spaced apart; a plurality of annular sealing members extending across the space between the edges; and a sealing liquid between annular members.

6. In a bearing structure for a vertical shaft member having an end recess; a cup member having a corresponding recess opposite the first recess; a ball in the recesses; said recesses defining an axis of rotation for said shaft coincident with the axes of said recesses; there being an annular well around the lower of the two recesses adapted to contain a sealing liquid; and an annular wall carried by the upper member and extending into said well.

7. In a bearing structure for a vertical shaft member having an end recess; a cup member having a corresponding recess opposite the first recess; a ball in the recesses; said recesses defining an axis of rotation for said shaft coincident with the axes of said recesses; said cup having another recess communicating with the first cup recess and open on the opposite end of the cup adapted to contain a lubricant; and a closure for said other recess.

8. In a bearing structure: a shaft having a recess terminating at an end surface of said shaft; a cup having a corresponding recess aligned with and opposed to said shaft recess, said cup having a surface about said cup recess opposed to said shaft end surface; said recesses having axes coincident with each other and determining an axis of rotation for said shaft coincident with said axes; a ball in the recesses; and flexible sealing means extending annularly about said recesses and in engagement with said opposed surfaces of said cup and said shaft respectively.

9. In a bearing structure for a vertical shaft member having an end recess; a cup member having a corresponding recess opposite the first recess; a ball in the recesses; said recesses defining an axis of rotation for said shaft coincident with the axes of said recesses; there being an annular well around the lower of the two recesses adapted to contain a sealing liquid; an annular wall carried by the upper member and extending into said well; and a pair of annular flexible sealing elements between said members, one of said pair of sealing elements being disposed inwardly of said well as well as inwardly of said annular wall, and the other of said pair of sealing elements being disposed outwardly of said well as well as outwardly of said annular wall.

FRANCIS WALTER GUIBERT.

REFERENCES CITED

The following references are of record in the file of this patent:

UNITED STATES PATENTS

| Number | Name | Date |
| --- | --- | --- |
| 640,009 | Mittinger | Dec. 26, 1899 |
| 682,346 | Sims | Sept. 10, 1901 |
| 1,305,824 | Mayer | June 3, 1919 |
| 2,352,469 | Carlson | June 27, 1944 |

FOREIGN PATENTS

| Number | Country | Date |
| --- | --- | --- |
| 531,258 | Great Britain | Jan. 1, 1941 |
| 558,662 | Great Britain | Jan. 14, 1944 |
| 346,686 | Germany | Jan. 5, 1922 |